United States Patent [19]
Stoner

[11] 3,923,409
[45] Dec. 2, 1975

[54] ADJUSTABLE COUPLING CLAMP ASSEMBLY

[75] Inventor: Jacob G. Stoner, Saginaw, Mich.

[73] Assignee: General Motors Corporation, Detroit, Mich.

[22] Filed: Jan. 22, 1975

[21] Appl. No.: 543,125

[52] U.S. Cl. .................. 403/290; 403/373; 403/379
[51] Int. Cl.² ............................................ F16B 2/02
[58] Field of Search ........... 403/373, 378, 379, 359, 403/344, 290

[56] References Cited
UNITED STATES PATENTS

| | | | |
|---|---|---|---|
| 570,309 | 10/1896 | Johnson | 403/290 |
| 2,270,895 | 1/1942 | Rabe | 403/359 |
| 2,723,140 | 11/1955 | Graham | 403/290 |
| 3,267,696 | 8/1966 | Sieja | 64/11 R |

FOREIGN PATENTS OR APPLICATIONS

| | | | |
|---|---|---|---|
| 623,514 | 3/1927 | France | 403/344 |

*Primary Examiner*—Andrew V. Kundrat
*Attorney, Agent, or Firm*—Arthur N. Krein

[57] ABSTRACT

An adjustable coupling clamp assembly adapted to encircle a shaft and to be clamped relative thereto by a bolt and nut forming part of the coupling clamp assembly, the coupling clamp assembly including a split ring terminating at one end in a radially outward extending bolt head engaging ear having an elongated slot opening therethrough and terminating at its other end in a similar ear having a circular aperture therethrough to receive the threaded end of the bolt, the bolt including an enlarged head with a shank extending therefrom, the shank including, in order, a reduced diameter annular portion next adjacent to the head adapted to be received in the slot opening of the bolt head receiving ear, a further reduced diameter portion, an intermediate enlarged portion provided with chordal flats thereon, and a free end portion of a diameter less than the intermediate portion that is threaded to receive a mating nut, the shaft being provided with a chordal recess or flat thereon against which a chordal flat on the bolt can engage to prevent rotation of the bolt as the nut is run up on the bolt and to effect axial locking of the shaft. The coupling clamp may be formed as an integral part of the tubular split end of a coupling shaft means adapted to telescopically receive the shaft or, it may be formed as a separate element to encircle the split end of such a coupling shaft means.

4 Claims, 4 Drawing Figures

ADJUSTABLE COUPLING CLAMP ASSEMBLY

This invention relates to shaft couplings and, in particular, to a coupling clamp assembly to effect attachment of a shaft telescopically received in a coupling shaft means.

Coupling clamps of the type having a split band or split ring with terminal ears extending from the ends thereof which are pierced so as to receive the bolt of a bolt and nut assembly to effect tightening of the split band or ring relative to annular elements, such as a shaft and the tubular end of a second shaft or coupling shaft means telescopically receiving the shaft, are well known.

In these prior art coupling clamps, it is customary to use a conventional bolt and nut to effect fastening and tightening of the split band of the clamp assembly, the bolt normally being either a conventional hex head bolt or a conventional carriage bolt. In these prior art arrangements, when the bolt is positioned to engage, for example, a suitable annular groove in the shaft to effect axial locking of the shaft relative to the coupling shaft means, it is normally necessary to insert the bolt after the shaft is initially assembled to the shaft coupling means. However, in certain assembly conditions, it is desirable to loosely assemble the bolt through the ears of the clamp with the nut thereon to effect a subassembly consisting of the coupling clamp and coupling shaft means, after which the shaft, in another assembly operation, is inserted into the coupling shaft means and then clamped relative thereto, as by such a coupling clamp.

Accordingly, it is the primary object of this invention to provide an improved coupling clamp assembly whereby a coupling clamp assembly may have its fastening and tightening means in the form of a bolt and nut pre-assembled, one of the ears of the coupling clamp being provided with an elongated slot therethrough to permit pivotal or rocking movement of the bolt whereby a shaft can be readily inserted into the coupling.

Another object of this invention is to improve a coupling clamp assembly for use in effecting connection between the split tubular end of a first shaft member telescopically receiving a second shaft whereby the clamp assembly can be loosely mounted on the split tubular end of the first shaft member while permitting the bolt of the fastening and tightening elements of this assembly to move out of interference relation with the second shaft to permit it to be inserted into the tubular end of the first shaft member.

It is still another object of this invention to improve a coupling clamp assembly for a male, female shaft assembly whereby the bolt of this assembly is provided with an enlarged intermediate shank portion provided with chordal flats thereon for engagement with a chordal recess on the male shaft to prevent rotation of the bolt as a nut is run up thereon and to thereby axially retain the male shaft.

These and other objects of the invention are obtained by means of an adjustable coupling clamp assembly for securing a shaft to the split tubular end of a coupling shaft means, the coupling clamp including a split ring clamp having its bolt receiving ear formed with an elongated slot therethrough and its other ear with a circular aperture therethrough to slidably receive the threaded end of a bolt, the bolt being insertable through these ears, the bolt including an enlarged head with a shaft extending therefrom, the shank including, in order, a reduced diameter annular shoulder next adjacent to the head, a further reduced diameter portion, an intermediate enlarged portion provided with a plurality of chordal flats on the outer periphery thereof and a free end, threaded, portion adapted to receive a complementary internally threaded nut, one of the chordal flats on the bolt being positioned to engage a chordal recess or flat provided for this purpose on the shaft whereby to prevent rotation of the bolt as the nut is run up thereon and, to effect axial locking of the shaft relative to the coupling shaft means.

For a better understanding of the invention, as well as other objects and further features thereof, reference is had to the following detailed description of the invention to be read in connection with the accompanying drawings, wherein.

Figure 1:
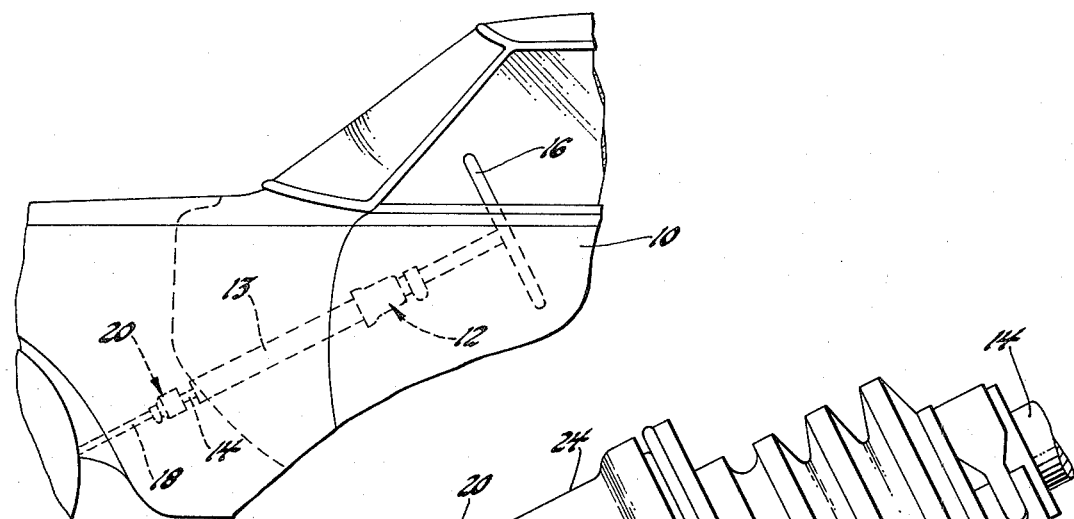
FIG. 1 is a fragmentary elevational view of an automotive vehicle provided with a steering shaft assembly including the adjustable coupling clamp in accordance with the invention.

Referring first to FIG. 1 of the drawings, there is shown, for purpose of illustrating an environment for the coupling clamp of the invention, a vehicle body 10 provided with a steering column assembly 12 including a mast jacket 13 normally fixed to the body of the vehicle, an upper steering shaft 14 rotatably mounted within the mast jacket and mounting at its upper end a steering wheel 16 and, a lower steering shaft 18 suitable drivingly connected to the vehicle steering gear, not shown, operatively connected to the chassis of the vehicle. An isolation coupling 20 interconnects the upper shaft 14 with the lower shaft 18.

Figure 2:
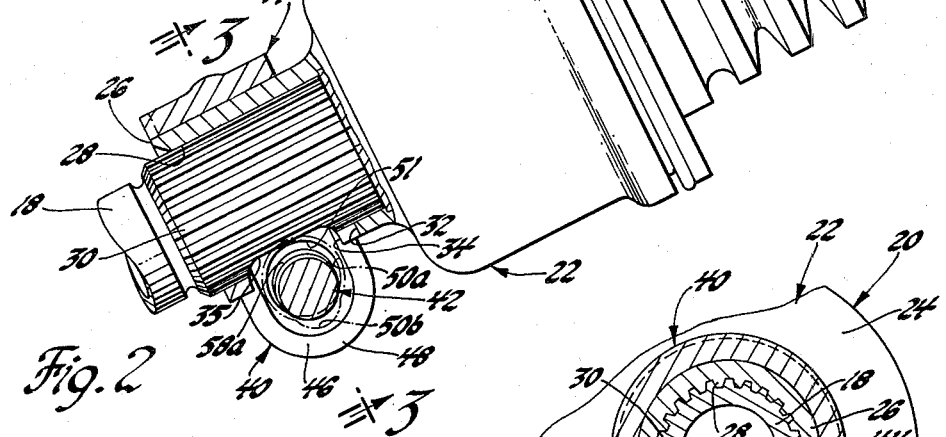
FIG. 2 is an enlarged sectional view of a portion of the steering shaft assembly of FIG. 1 including the adjustable coupling clamp of the invention.
Figure 5:
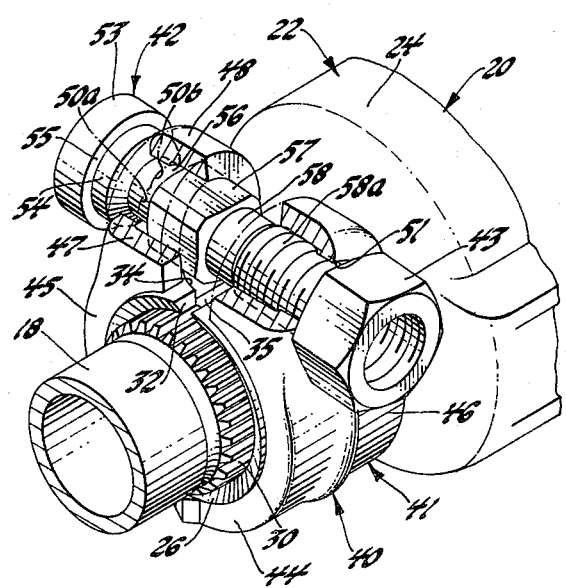

As best seen in FIGS. 2 and 5, coupling 20, which may, for example, be of the type disclosed in U.S. Pat. No. 3,267,696 for "Vibration Isolation Coupling" issued Aug. 23, 1966 to Chester E. Sieja, includes a coupling shaft member 22 having a main generally cup-shaped body portion 24 and an annular flange or tubular portion 26 that is internally splined, as indicated at 28, for engagement with the complementary splines 30 provided for this purpose at the one end, upper end as seen in FIGS. 1 and 2, of lower shaft 18 whereby to non-rotatably mount the coupling to this shaft. The annular flange or tubular portion 26 is provided with a slot 32 through a wall thereof which extends from the free end, longitudinally, thereof so as to permit it to be compressively clamped over lower shaft 18 against movement axially thereof by a coupling clamp assembly constructed in accordance with the invention, which may be formed integral with flange portion 26 or, as shown, formed as a separate coupling clamp assembly 40 positioned to encircle the flange portion 26. In addition, the slot 32 intersects a chordal recess 34 in the flange portion 26, for a purpose which will become apparent. The splined end of lower shaft 18 is also provided with a chordal recess or flat 35 for a purpose which will be described, it being noted that when assembling the shaft 18 into the splined flange portion 26, the chordal recess or flat 35 is aligned with the center of slot 32 and is thus substantially parallel to the chordal recess 34.

Referring now to the subject matter of the invention, the coupling clamp assembly 40 includes a split band or split ring type clamp 41, a bolt 42 and nut 43. Clamp 41 may, for example, be stamped from suitable heavy guage metal, such as steel, in substantially U-form to define a semi-circular coupling shaft means receiving bight provided by a split band or ring 44 with terminal ears 45 and 46 extending from the ends thereof, the ears extending in spaced apart coextensive relation substantially tangentially from the bight. Ears 45 and 46 may themselves each terminate in side flanges 47 and in an end flange 48 to provide reinforcement against bending of the ears. Terminal ear 45, which is the bolt head engaging ear, is provided with a slot aperture therethrough which includes a major portion 50a in the form of a substantially circular aperture of a predetermined diameter and a minor portion 50b in the form of a semi-circular aperture of a diameter substantially less than that of the major portion, the minor portion 50b extending toward the free end of ear 45. Terminal ear 46, which may be referred to as a bolt receiving ear, is provided with a bolt hole 51 of a size to loosely receive the threaded end of bolt 42 and substantially coaxial with the major portion 50a of the slot aperture in ear 45.

Figure 3:
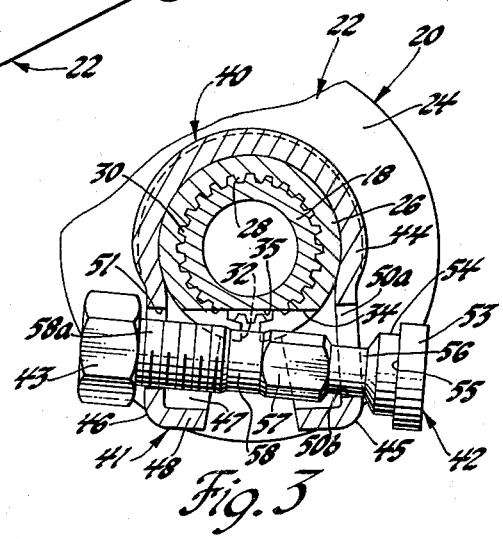
FIG. 3 is a sectional view taken along line 3–3 of FIG. 2 showing the bolt and nut of the coupling clamp loosely secured in the ears of the clamp per se, and with the bolt axially positioned whereby it can pivot or rock to permit insertion of a shaft.
Figure 4:
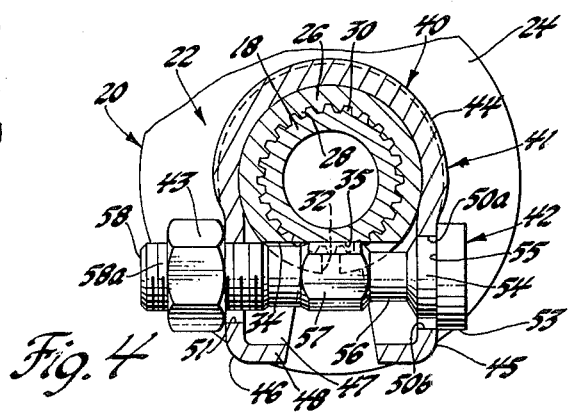
FIG. 4 is a view similar to FIG. 3 but showing the bolt properly oriented in the ears of the clamp and the nut run up thereon to effect fastening and tightening of the band portion of the coupling clamp relative to a shaft; and, FIG. 5 is a perspective view of the portion of the steering shaft assembly shown in FIG. 2 but rotated 180°.

In the free form of the clamp 41, the ears 45 and 46 are spaced apart, preferably at a diverging angle relative to each other as seen in FIG. 3, so that upon tightening of the clamp, these ears will approach a spaced apart, substantially parallel relationship to each other as seen in FIG. 4.

Bolt 42 includes an enlarged head 53, which may be of any desired shape, being an annular head in the embodiment shown, with a bolt shank extending therefrom. The bolt shank, in order, includes an annular portion 54 of a reduced diameter compared to the heat next adjacent to the head to define the limits of an annular shoulder 55 on the underside of the head, a reduced diameter annular portion 56 and an enlarged portion provided with a plurality of chordal flats 57 thereon, four such flats being illustrated in the embodiment shown to define a square neck shank portion, the dimension across the corner thereof being equal to or less than the diameter of the annular shoulder portion 54, and a reduced diameter free end portion 58, compared to portion 54 that is provided with external threads 58a formed complementary to the internal threads of the nut 43. The annular portion 54 of the bolt 42 is of a diameter to be slidably received in the major portion 50a of the aperture in ear 45 while the reduced diameter annular portion 56 of this bolt is of a diameter to be slidably received in the minor portion 50b of the aperture.

With this arrangement of the coupling clamp assembly, the clamp 41 can be assembled to the annular flange 26 of the coupling 20 with the bolt 42 inserted through the ears 45 and 46 and with the nut 43 loosely threaded on the end thereof, as shown in FIG. 3, so that this entire assembly can be coupled to the upper steering shaft 14 so that this portion of the steering column assembly 12 may be secured to the body of the vehicle as a subassembly. After which this subassembly of the body and portions of the steering assembly can be lowered onto the vehicle chassis and then the lower steering shaft 18 can be inserted into the annular flange 26 to effect final assembly of the steering column assembly.

This is possible, because with the bolt loosely positioned in the clamp 41 as shown in FIG. 3, upon insertion of the shaft 18 into the annular flange 26, engagement of the shaft against the bolt 42 will cause it to rock in the bolt hole 51 in ear 46 since, as shown in FIG. 3, the bolt 42 is free to move axially to the right as seen in this figure to permit the reduced diameter annular portion 56 to drop into the minor portion 50b of the slot aperture in the ear 45 to thereby permit movement of the bolt 42 out of interference engagement with the shaft 18 to the position shown in FIG. 3. Of course, priot to assembly of the shaft 18 into the annular flange 26, the assembler would effect alignment of the shaft 18 so that the chordal flat 35 thereon would be in alignment with the slot 32 in the annular flange 26 and then the shaft would be inserted to the axial position shown in FIG. 2, so that his chordal flat 35 on the shaft 18 would be positioned in alignment with the axis of bolt 42.

With the shaft 18 thus aligned in the annular flange 26, the operator can be simultaneously rotate and move the bolt 42 axially in a direction so that the annular portion 54 of the bolt would be engaged in the major portion 50a of the slot aperture in the ear 45 and with a chordal flat 57 on the bolt positioned substantially parallel to the flat of the chordal recess 35 on the shaft 18 after which the nut 43 can be run up on the bolt 42 to effect fastening and tightening of the clamp 41 and the annular flange 26 against the splined end of the shaft 18.

A chordal flat 57 on the bolt 42 engaging the flat provided by the chordal recess 35 of the shaft 18 will prevent rotation of the bolt 42 as the nut 43 is run up thereon and at the same time it effectively locks the shaft 18 against axial movement of this shaft relative to the annular flange 26. It will now be apparent that the chordal recess 34 on the annular flange 26 is provided for the purpose of allowing the enlarged portion of the bolt with the chordal flats 57 thereon to extend radially inward of the annular flange to engage into the chordal recess 35 on the shaft 18.

Although in the embodiment shown, the shaft 18 has been shown as coupled to the tubular end of the coupling shaft member 22 of an isolation coupling 20 with the coupling clamp assembly 40 of the invention used to secure these elements together, it is to be realized that the coupling clamp assembly can be used to effect coupling of any desired cylindrical mating elements and that the clamp elements of this assembly can be formed integral with the female element thereof or it can be formed as a separate element adapted to encircle the female element which would be suitably slotted to permit it to be tightened around the mating male element.

What is claimed is:

1. An adjustable coupling clamp assembly for a cylindrical shaft having a recessed flat portion on the outer periphery thereof adjacent to one end thereof, said adjustable coupling clamp assembly including a clamp and a fastening and tightening means consisting of a split ring having ears extending from the ends thereof, said ears in the free form of said clamp being in spaced apart relation to each other, said ears being apertured to receive said fastening and tightening means which includes a bolt and a nut, one of said ears having a circular aperture therethrough and the other of said ears having an elongated slot aperture therethrough, said bolt including an annular head integral with a shank extending therefrom including, in order, a reduced diameter annular shank portion next adjacent said head to define with said head an annular shoulder on said head, a further reduced diameter shank portion extending from said annular shank portion, an intermediate portion provided with a plurality of flats thereon for cooperation with said recessed flat on said shaft and, a free end portion of a diameter less than the maximum diameter of said intermediate portion and externally threaded to receive said nut which has a corresponding internal thread diameter, said interemediate portion with said flats being positioned when said head of said bolt is in abutment against said other of said ears to engage said flat recess on the shaft whereby said bolt is secured against rotation to permit said nut to be run up on said bolt to effect tightening of said split ring relative to the shaft.

2. An adjustable coupling clamp assembly according to claim 1 wherein said elongated slot aperture includes a major portion in the form of substantially circular aperture of a diameter to slidably receive said annular shank portion and a minor portion in the form of a semi-circular aperture to slidably receive further reduced diameter shank portion of said bolt.

3. In the combination of a shaft having external splines at one end thereof with a recessed chordal flat thereon telescopically received in the split and internally splined tubular end of a mating coupling shaft element, the tubular end of which is provided with a chordal recess intersecting the slot and a coupling clamp assembly encircling the tubular end and including a clamp, a bolt and a nut, the improvement wherein said clamp includes a split band having a bolt head engaging ear extending from one end thereof having an elongated slot aperture therethrough including a major diameter portion and a minor diameter portion and a second ear extending from the other end with a bolt hole therethrough and, wherein said bolt includes an enlarged head having a shank extending from one side thereof, said shank including, in order, a first annular portion of a predetermined diameter, a second annular portion of reduced diameter compared to said first annular portion, an enlarged portion provided with at least one chordal flat thereon and a free end portion with external threads thereon to threadingly receive said nut, said enlarged portion being axially spaced along said shank so that when said head of said bolt engages said bolt head engaging ear said chordal flat is in position to engage the chordal flat on the shaft to limit rotational movement of said bolt.

4. In the combination according to claim 3 wherein said major diameter portion of said elongated slot is in the form of a substantially circular aperture of a diameter to slidably receive said first annular portion of said bolt and said minor diameter portion is in the form of a semi-circular aperture to slidably receive said second annular portion of said bolt.

* * * * *